United States Patent
Kimoto et al.

(12) 
(10) Patent No.: US 6,348,944 B1
(45) Date of Patent: *Feb. 19, 2002

(54) SELECTIVE AGING FOR MONITOR PRODUCTION

(75) Inventors: Masanobu Kimoto; Tadashi Fujise, both of San Diego, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,102

(22) Filed: Oct. 24, 1997

(51) Int. Cl.⁷ .................... H04N 17/00; H04N 17/02
(52) U.S. Cl. ............... 348/173; 348/177; 348/178; 348/189; 348/180
(58) Field of Search .................... 348/190, 189, 348/191, 658, 177, 184, 173, 178, 180; 445/6, 23, 5; 315/370, 371; H04N 17/00, 17/02

(56) References Cited

U.S. PATENT DOCUMENTS

| | | | |
|---|---|---|---|
| 1,983,668 A | | 12/1934 | Jones et al. ............... 250/27.5 |
| 2,917,357 A | | 12/1959 | Nash et al. ............... 316/27 |
| 3,321,263 A | | 5/1967 | O'Fallon ............... 316/18 |
| 3,357,766 A | * | 12/1967 | Conger ............... 445/6 |
| 3,434,770 A | | 3/1969 | Angelucci et al. ............... 316/1 |
| 3,441,333 A | | 4/1969 | Javorik ............... 316/26 |
| 3,966,287 A | * | 6/1976 | Liller ............... 445/5 |
| 4,125,306 A | * | 11/1978 | Coble ............... 445/6 |
| 4,392,834 A | * | 7/1983 | Smith ............... 445/6 |
| 4,395,242 A | * | 7/1983 | Liller et al. ............... 445/5 |
| 4,457,731 A | * | 7/1984 | Patrickson et al. ............... 445/2 |
| 4,557,699 A | | 12/1985 | Bolinsky et al. ............... 445/3 |
| 4,832,646 A | * | 5/1989 | Chung et al. ............... 445/6 |
| 4,929,209 A | * | 5/1990 | Matsuo et al. ............... 445/6 |
| 5,099,326 A | * | 3/1992 | Hakamada et al. ............... 348/190 |
| 5,671,011 A | * | 9/1997 | Kim ............... 348/189 |
| 5,699,111 A | * | 12/1997 | Dairiki et al. ............... 348/181 |
| 5,742,338 A | * | 4/1998 | Nose ............... 348/190 |
| 5,790,189 A | * | 8/1998 | Moon ............... 348/189 |
| 6,014,168 A | * | 1/2000 | Webb et al. ............... 348/190 |

OTHER PUBLICATIONS

Bernard Grob, Basic Television and video systems, McGraw–Hill Book Company, pp. 169,170,202,203, 1984.*

* cited by examiner

Primary Examiner—Reinhard J. Eisenzopf
Assistant Examiner—Linus H. Lo
(74) Attorney, Agent, or Firm—Blakely, Sokoloff, Taylor & Zafman LLP

(57) ABSTRACT

The present invention relates a method and system for providing aging of a cathode ray tube. The system comprises a video processing circuit that is configured to generate a first luminance signal and a second luminance signal. The system also comprises an electron gun located in the cathode ray tube, that is coupled to the video processing circuit. The electron gun is configured to operate at a first luminance level corresponding to the first luminance signal for a first predetermined period of time, and a second luminance level corresponding to the second luminance signal for a second predetermined period of time.

34 Claims, 3 Drawing Sheets

SELECTIVE AGING FOR MONITOR PRODUCTION

BACKGROUND OF THE INVENTION

1. Field of the Invention

The present invention relates in general to monitors, and more particularly, to a method and apparatus for providing selective aging for monitor production.

2. Description of the Related Art

Electronic display systems include a display monitor that is typically subjected to a process known as "aging" during manufacture. This process involves the warming up of cathode ray tubes ("CRT") to facilitate testing of circuitry and adjustment of various display parameters.

The amount of aging, A, may be expressed as follows:

$$A = \text{aging time} \times \text{monitor luminance}$$

where luminance indicates the amount of light intensity which is perceived by the eye as brightness. Luminance control is also termed "white balance" since white light may be considered and provided as a mixture of the red, green and blue primary colors in the proper proportions. In CRTs, drift characteristics result in image luminance distortion or the alteration of the white balance. Aging is necessary to reduce the effects of temperature drift.

In conventional aging systems, monitor luminance cannot be adjusted. Accordingly, to obtain the required amount of aging, the only parameter that can be increased is aging time. As a result, typical aging periods may take up to 3 hours, and also include a cooling off period of about 1 hour. Such a conventional technique is inflexible and cannot accommodate input signals with multiple frequencies. In addition, the aging time is lengthy.

Accordingly, there is a need in the technology for a method and apparatus for effectively testing circuitry during the aging process, while decreasing the time involved for the aging process.

BRIEF SUMMARY OF THE INVENTION

The present invention relates a method and system for providing aging of a cathode ray tube. The system comprises a video processing circuit that is configured to generate a first luminance signal and a second luminance signal. The system also comprises an electron gun located in the cathode ray tube, that is coupled to the video processing circuit. The electron gun is configured to operate at a first luminance level corresponding to the first luminance signal for a first predetermined period of time, and a second luminance level corresponding to the second luminance signal for a second predetermined period of time.

DETAILED DESCRIPTION OF THE INVENTION

The present invention is an apparatus and method of providing aging of a cathode ray tube. An electron gun in the cathode ray tube is configured to operate at a first luminance level corresponding for a first predetermined period of time, and a second luminance level for a second predetermined period of time. During the first predetermined period of time, testing of circuitry located in the cathode ray tube may be performed. During the second predetermined period of time, adjustment of display parameters of the cathode ray tube may be performed.

Figure 1:
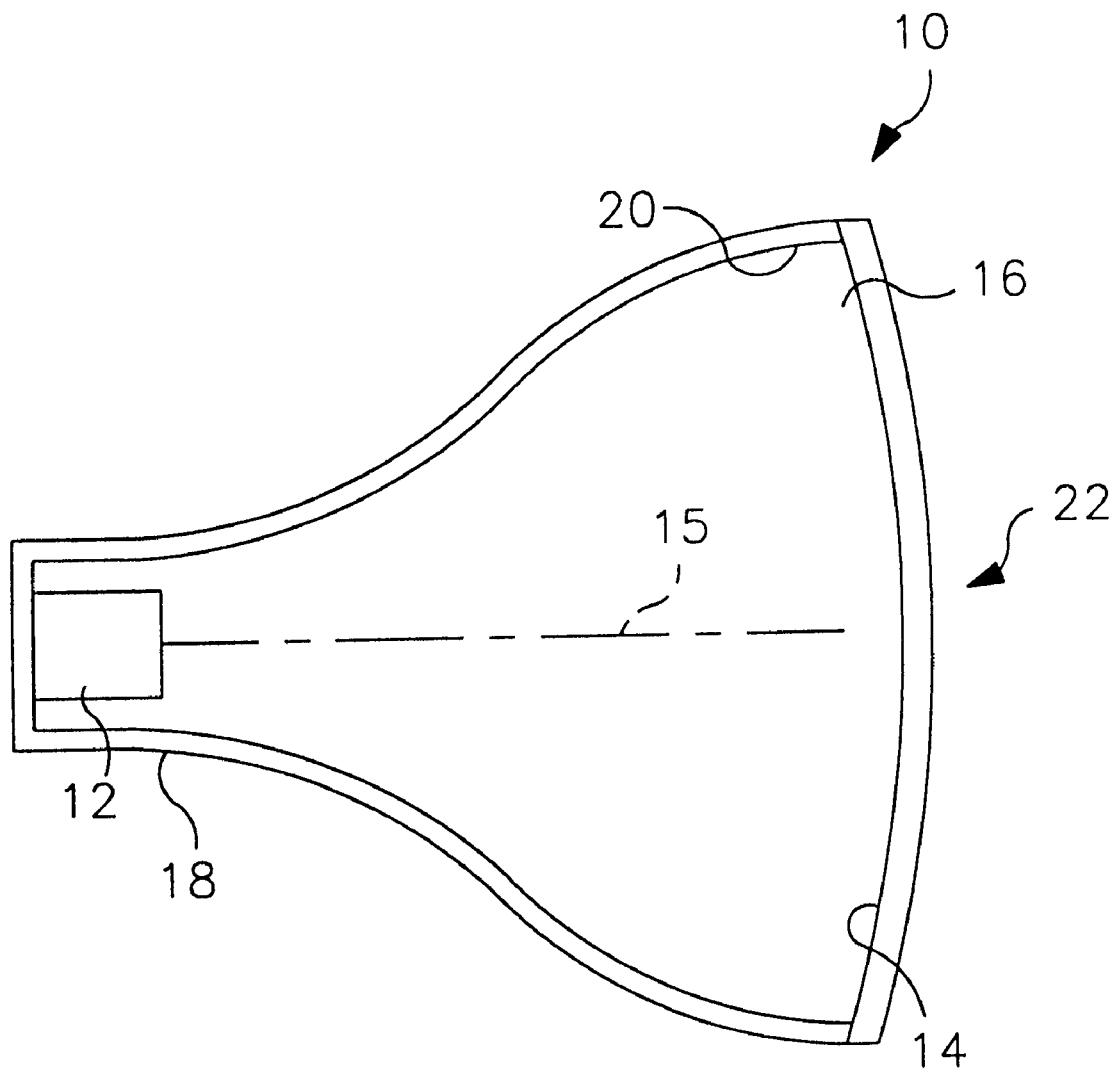
FIG. 1 is a cross sectional view of a conventional cathode ray tube.

As shown in FIG. 1, the CRT 10 consists of an electron gun 12 and a phosphor screen 14 that is located inside an evacuated glass envelope 16. The narrow neck 18 of the CRT 10 contains the electron gun 12, which generates a beam of electrons 15. The beam 15 is accelerated towards the screen 14 by a positive anode voltage. The anode 20 is a conductive coating on the inside surface of the wide glass bell portion of the CRT 10. To form the screen, the inside of the faceplate 22 is coated with a luminescent material that produces light when excited by electrons in the beam 15. A monochrome picture tube has one electron gun and a continuous phosphor coating that produces a picture in black and white. For color picture tubes, the screen 14 is formed with dot trios or vertical lines of red, green and blue phosphors. In such color picture tubes, there are three electron beams, one for each color phosphor. Each of the three electron beams is emitted by a separate cathode.

During the manufacture of monitors such as the CRT 10, the monitor is subject to an aging process which involves operating the CRT 10 at least, at a first predetermined luminance level for a first predetermined period of time, followed by operating the CRT 10 at a second predetermined luminance level for a second predetermined period of time. It is contemplated that the CRT 10 may also be operated at more than two predetermined luminance levels, each at a corresponding predetermined period of time. The number of luminance levels and the corresponding length of aging periods may be selected according to need and/or specification. The only requirement is that for each period of aging, the following equation must be satisfied:

$$\text{Amount of aging} = \text{aging time} \times \text{monitor luminance} \qquad (1)$$

where luminance indicates the amount of light intensity which is perceived by the eye as brightness.

Figure 2:
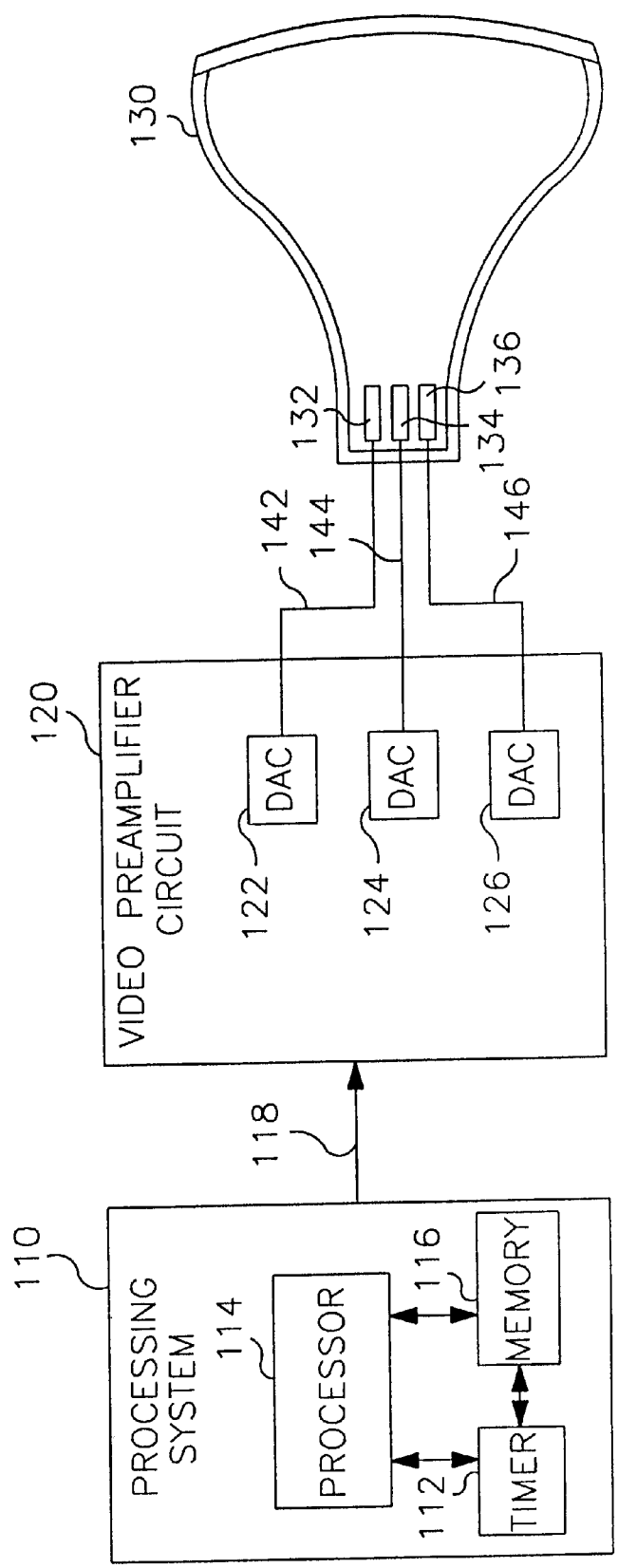
FIG. 2 illustrates a testing system 100 that performs the aging process in accordance with the principles of the present invention.

The aging process facilitates testing of circuitry and adjustment of operating levels within the CRT 10. FIG. 2 illustrates a testing system 100 that performs the aging process in accordance with the principles of the present invention. The testing system 100 comprises a processing system 110 that includes a timer 112, a video preamplifier circuit or video processing circuit 120 that includes three digital-to-analog converters (DACs) 122, 124, 126 and a CRT 130 that includes a red electron gun 132, a green electron gun 134 and a blue electron gun 136. In one embodiment, the processing system 110 is a controller. In another embodiment, the processing system 110 further comprises a processor 114 and memory 116. The processing system 110 is coupled to the video preamplifier circuit 120 via signal line 118. In one embodiment, the signal line 118 is an Inter-integrated Circuit ("I²C") bus. Each of the DACs 122, 124 and 126 is coupled to a corresponding electron gun 132, 134 and 136 via a corresponding signal line 142, 144 and 146. The testing system 100 issues control and data signals to the video preamplifier circuit 120 to control the length of aging time and the corresponding luminance level for each electron gun 132, 134 and 136.

The processor 114 generates digital control signals that are provided to the video preamplifier circuit 120 while the timer 112 generates timing signals to the video preamplifier circuit 120. The digital control signals are converted by each DAC 122, 124 and 126 to provide analog luminance signals to the respective electron guns 132, 134, 136. In particular, the control signals include values for operating each electron gun 132, 134 and/or 136 at predetermined luminance levels for the corresponding predetermined periods of time, as described in detail in the following sections. In one embodiment, the memory 116 stores the values for operating each electron gun 132, 134 and/or 136, which are retrieved by the processor 114 when necessary.

Figure 3:
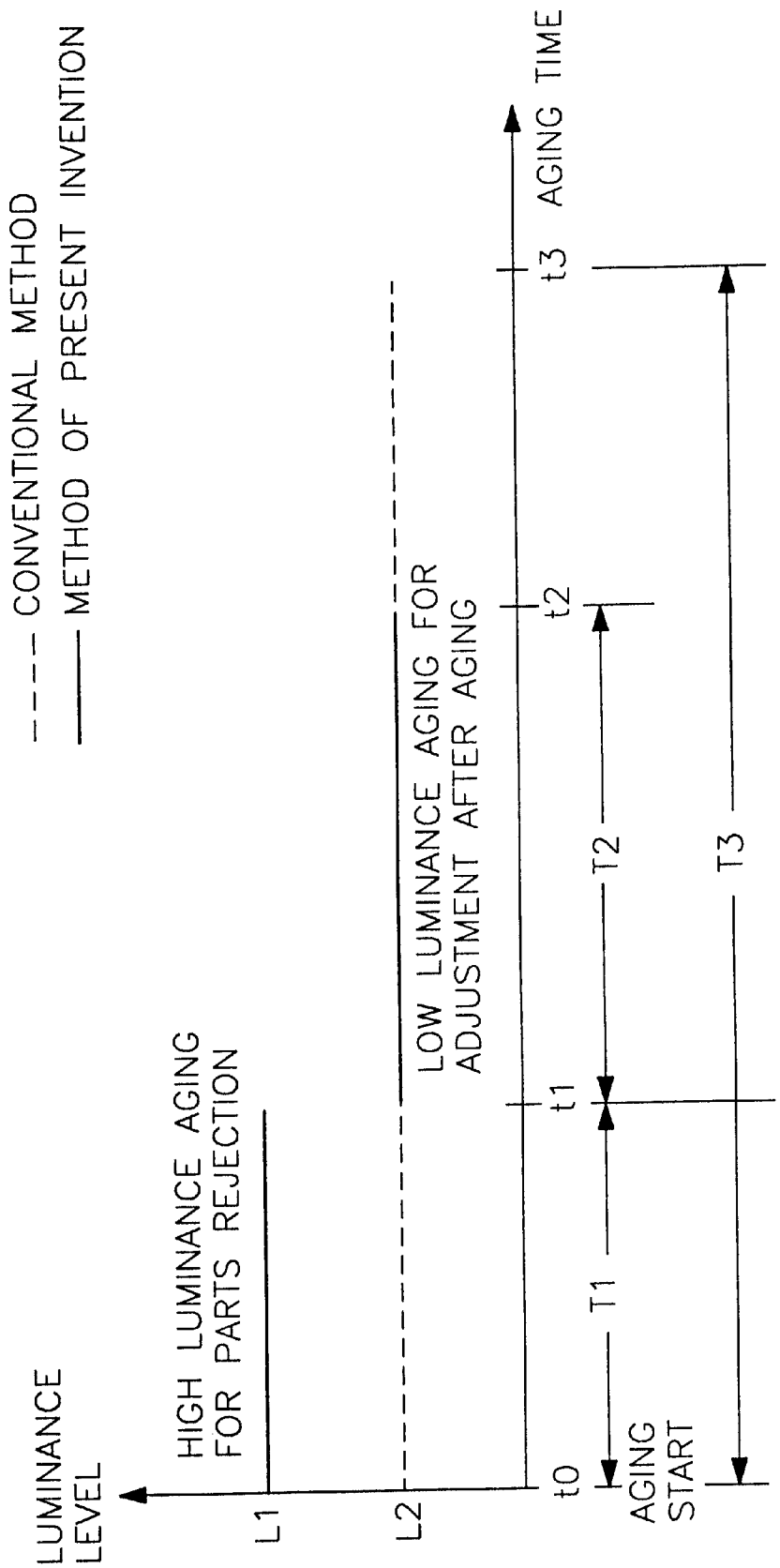
FIG. 3 is a graph illustrating the luminance level and the corresponding aging time for one embodiment of the selective aging process of the present invention and for a conventional aging process.

FIG. 3 is a graph illustrating the luminance level and the corresponding aging time for one embodiment of the selective aging process of the present invention and for a conventional aging process. In one embodiment, the selective aging process 100 of the present invention provides aging at a first predetermined luminance level L1 for a first predetermined period of time T1, which is followed by aging at a second predetermined luminance level L2 for a second predetermined period of time T2. The first predetermined luminance level L1 is typically a high luminance level and the second predetermined luminance level L2 is typically a low luminance level. In one embodiment, the luminance level L1 is selected from the range 100 nits<L1<140 nits and the corresponding period T1 is selected from the range 30 mins<T1<50 mins; while the luminance level L2 is selected from the range 40 nits<L2<80 nits and the corresponding period T2 is selected from the range 10 mins<T2<30 mins. In another embodiment, L1 is 120 nits with a corresponding period T1 of 40 minutes; while L2 is 60 nits with a corresponding period of 20 minutes. As described above, any luminance level may be combined with a predetermined period of aging, as long as equation (1) is satisfied.

By conducting aging at a first high luminance level, screening for circuit failure may be accomplished. The second period of aging, i.e., T2, facilitates cooling of the CRT 130, as well as adjustment of display parameters following aging. It can be observed by applying the exemplary levels of L1=120 nits, T1=40 minutes; and L2=60 nits, T2=20 minutes, the present invention provides screening of parts while reducing the aging period by 40 minutes, as compared to the conventional method ink which aging was conducted at one low luminance level, typically 60 nits, for at least 100 minutes. In this example, it can be observed that the process of the present invention reduces the time required for aging by at least 40 minutes [T3−(T1+T2)].

Accordingly, the present invention provides a method and apparatus for effectively testing circuitry in a CRT during the aging process, while decreasing the time involved for the aging process.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A test system for providing aging of a cathode ray tube, comprising:
 a video processing circuit configured to generate a first luminance level signal to test and age the cathode ray tube and a second luminance level signal differing from the first luminance level signal to test and age the cathode ray tube; and
 a first electron gun located in the cathode ray tube, said first electron gun coupled to said video processing circuit, said first electron gun being configured to operate at a first luminance level corresponding to the first luminance level signal to test and age the cathode ray tube for a first predetermined period of time, and being configured to operate at a second luminance level differing from the first luminance level corresponding to the second luminance level signal to test and age the cathode ray tube for a second predetermined period of time differing from the first predetermined period of time.

2. The test system of claim 1, further comprising:
 a processing system coupled to said video processing circuit, said processing system having a processor that is configured to provide a first control signal and a second control signal, and,
  wherein said video processing circuit to generate said first and second luminance level signals in response to said first and second control signals respectively.

3. The test system of claim 2, wherein said processing system further has a timer coupled to said processor to generate timing signals to form said first predetermined period of time and said second predetermined period of time.

4. The test system of claim 2, further comprising:
 a memory coupled to said processor, said memory to store a first value and a second value corresponding to said first control signal and said second control signal respectively.

5. The test system of claim 2, wherein the first predetermined period of time is provided by said first control signal, and the second predetermined period of time is provided by said second control signal.

6. The test system of claim 1, wherein the first luminance level is selected from a range between 100 and 140 nits and the first predetermined period of time is selected from a range between 30 and 50 minutes.

7. The test system of claim 1, wherein the second luminance level is selected from a range between 40 and 80 nits and the second predetermined period of time is selected from a range between 10 and 30 minutes.

8. The test system of claim 1, wherein the first luminance level is substantially 120 nits and the first predetermined period of time is substantially 40 minutes and the second predetermined luminance level is substantially 60 nits and the second predetermined period of time is substantially 20 minutes.

9. The test system of claim 1, wherein a first amount of aging is equal to the first luminance level multiplied by the first predetermined period of time, and wherein a second amount of aging is equal to the second luminance level multiplied by the second predetermined period of time.

10. The test system of claim 1, further comprising:
 a second electron gun located in the cathode ray tube, said second electron gun coupled to said video processing circuit, said second electron gun being configured to operate at the first luminance level corresponding to the first luminance level signal to test and age the cathode ray tube for the first predetermined period of time, and being configured to operate at the second luminance level corresponding to the second luminance level signal to test and age the cathode ray tube for the second predetermined period of time.

11. A method for providing aging of a cathode ray tube, the method comprising:
 (a) generating a first luminance level signal to test and age the cathode ray tube and a second luminance level signal differing from the first luminance level signal to test and age the cathode ray tube;

(b) operating a first electron gun located in the cathode ray tube, at a first luminance level corresponding to the first luminance level signal to test and age the cathode ray tube for a first predetermined period of time; and (c) operating the first electron gun at a second luminance level differing from the first luminance level corresponding to the second luminance level signal to test and age the cathode ray tube for a second predetermined period of time differing from the first predetermined period of time.

12. The method of claim 11, further comprising:
testing circuitry located in the cathode ray tube when operating the first electron gun at the first luminance level.

13. The method of claim 11, further comprising:
adjusting at least one display parameter of the cathode ray tube when operating the first electron gun at the second luminance level.

14. The method of claim 11, further comprising:
storing into a memory a first value and a second value corresponding to said first luminance level signal and said second luminance level signal respectively, prior to generating the first luminance level signal and the second luminance level signal.

15. The method of claim 14, further comprising:
storing into a memory a first timing value and a second timing value corresponding to the first predetermined period of time and the second predetermined period of time respectively, prior to generating the first luminance level signal and the second luminance level signal.

16. The method of claim 11, wherein the first luminance level is selected from a range between 100 and 140 nits and the first predetermined period of time is selected from a range between 30 and 50 minutes.

17. The method of claim 11, wherein the second luminance level is selected from a range between 40 and 80 nits and the second predetermined period of time is selected from a range between 10 and 30 minutes.

18. The method of claim 11, wherein the first luminance level is substantially 120 nits and the first predetermined period of time is substantially 40 minutes, and the second luminance level is substantially 60 nits and the second predetermined period of time is substantially 20 minutes.

19. The method of claim 11, wherein a first amount of aging is equal to the first luminance level multiplied by the first predetermined period of time, and a second amount of aging is equal to the second luminance level multiplied by the second predetermined period of time.

20. The method of claim 11, further comprising:
operating a second electron gun located in the cathode ray tube at the first luminance level to test and age the cathode ray tube for the first predetermined period of time; and,
operating the second electron gun at the second luminance level to test and age the cathode ray tube for the second predetermined period of time.

21. The test system of claim 10, further comprising:
a third electron gun located in the cathode ray tube, said third electron gun coupled to said video processing circuit, said third electron gun being configured to operate at the first luminance level corresponding to the first luminance level signal to test and age the cathode ray tube for the first predetermined period of time, and being configured to operate at the second luminance level corresponding to the second luminance level signal to test and age the cathode ray tube for the second predetermined period of time.

22. The test system of claim 1, wherein said video processing circuit is configured to generate a third luminance level signal to test and age the cathode ray tube and wherein the first electron gun being configured to operate at a third luminance level corresponding to the third luminance level signal to test and age the cathode ray tube for a third predetermined period of time.

23. The test system of claim 10, wherein
the cathode ray tube is a color cathode ray tube and said first electron gun, said second electron gun, and said third electron gun generate three electron beams, each beam for each color phosphor of a dot trio of phosphors.

24. A method of rapidly testing a cathode ray tube, the method comprising:
generating a high luminance level signal and a second luminance level signal;
testing for parts rejection by operating an electron gun located in the cathode ray tube to generate a high luminance level corresponding to the high luminance level signal for a first predetermined time period and if it is determined that a part is rejected, skipping a next step of adjusting display parameters, else;
adjusting display parameters of the cathode ray tube by operating the electron gun to generate a low luminance level corresponding to the low luminance level signal for a second predetermined time period.

25. The method of claim 24, wherein operating the electron gun at the relatively high luminance level during testing reduces the second predetermined time period necessary to adjust the display parameters.

26. The method of claim 24, wherein the sum of the first predetermined time period and the second predetermined time period is the aging time of the cathode ray tube.

27. The method of claim 24, wherein operating the electron gun at the relatively low luminance level further provides for cooling of the cathode ray tube.

28. The method of claim 24, wherein the high luminance level signal generates the high luminance level in a range between 100 nits and 140 nits and the low luminance level signal generates the low luminance level in a range between 40 nits and 80 nits.

29. The method of claim 24, wherein the first predetermined period of time is in a range between 30 minutes and 50 minutes and the second predetermined period of time is in a range between 10 minutes and 30 minutes.

30. A cathode ray tube test system comprising:
a processing system to generate digital control signals and timing signals associated with a selection of a plurality of luminance level signals for an electron gun, the digital control signals and timing signals to cause the generation of a high luminance level during a first time period to age and test the cathode ray tube;
a digital bus coupled to the processing system to receive the digital control signals and timing signals associated with the plurality of luminance level signals for the electron gun; and
a video processing circuit coupled to the digital bus to receive the digital control signals and the timing signals, the video processing circuit to generate the selection of the plurality of luminance level signals for the electron gun during respective plurality of time periods to test and age the cathode ray tube in response to the digital control signals and timing signals, the video processing circuit to generate the high luminance level signal for the first time period as the first luminance level signal of the plurality of luminance level signals.

31. The test system of claim 30, wherein, the digital bus is an Inter-integrated Circuit (I²C)bus.

32. The test system of claim 30, wherein, the processing system includes, a timer to generate the timing signals, and a processor to generate the digital control signals.

33. The test system of claim 32, wherein, the processing system further includes, a memory coupled to the processor, the memory to store data for the processor to generate the digital control signals and the timer to generate the timing signals.

34. The test system of claim 30, wherein, the video processing circuit includes, a digital to analog converter to couple to the electron gun, the digital to analog converter to generate the plurality of luminance level signals during the respective plurality of time periods in response to the digital control signals and timing signals.

* * * * *